United States Patent [19]

Goyert et al.

[11] 4,317,890

[45] Mar. 2, 1982

[54] THERMOPLASTIC SYNTHETIC MATERIAL AND A PROCESS FOR ITS PRODUCTION

[75] Inventors: Wilhelm Goyert, Cologne; Albert Awater, Odenthal; Wolfgang Grimm; Karl-Heinz Ott, both of Leverkusen; Wolfgang Oberkirch, Cologne; Hans Wagner, Dormagen, all of Fed. Rep. of Germany

[73] Assignee: Bayer Aktiengesellschaft, Bayerwerk, Fed. Rep. of Germany

[21] Appl. No.: 103,004

[22] Filed: Dec. 13, 1979

[30] Foreign Application Priority Data

Dec. 16, 1978 [DE] Fed. Rep. of Germany ....... 2854407

[51] Int. Cl.$^3$ ..................... C08L 75/04; C08L 75/06
[52] U.S. Cl. ..................................................... 525/66
[58] Field of Search .......................................... 525/66

[56] References Cited

U.S. PATENT DOCUMENTS

| | | | |
|---|---|---|---|
| 3,049,505 | 8/1962 | Grabowski | 525/66 |
| 3,970,717 | 7/1976 | Muller-Albrecht | 525/66 |
| 4,179,479 | 12/1979 | Carter | 525/66 |

FOREIGN PATENT DOCUMENTS 54-7827  4/1979  Japan ...................................... 525/66

*Primary Examiner*—Paul Lieberman
*Attorney, Agent, or Firm*—Gene Harsh; Joseph C. Gil

[57] ABSTRACT

The instant invention is directed to a thermoplastic synthetic material, comprising:
(A) 75 to 97% by weight of a thermoplastic polyurethane and
(B) 25 to 3% by weight of a polymer of olefinically unsaturated monomers, wherein component (B) is a graft product of
  (a) 5 to 35% by weight, based on the graft product, of one or more graft monomers on
  (b) 65 to 95% by weight, based on the graft product, of an elastomer component serving as graft base which has a second order transition temperature of below −30° C., the entire component (B) containing less than 50% by weight of the monomers styrene, α-methyl styrene and acrylonitrile. The instant invention is also directed to a process for the production of the thermoplastic synthetic materials.

11 Claims, No Drawings

THERMOPLASTIC SYNTHETIC MATERIAL AND A PROCESS FOR ITS PRODUCTION

BACKGROUND OF THE INVENTION

This invention relates to thermoplastically processible mixtures ("blends") of thermoplastic polyurethanes ("TPU") and special rubber graft polymers and to a process for producing these blends.

It is known that polyurethanes ("PUR") can be mixed ("blended") with graft copolymers of acrylonitrile, styrene and butadiene ("ABS"-polymers), as is taught for example in U.S. Pat. No. 3,049,505. The ABS-polymer used is obtained by grafting from 40 to 80% by weight of the "graft monomers," styrene and acrylonitrile, onto 20 to 60% by weight of the elastomer component, polybutadiene, used as "graft base." In the ABS-polymer used in the Examples of U.S. Pat. No. 3,049,505, the ratio by weight of graft monomers to graft base is 70:30. The TPU/ABS-blends according to U.S. Pat. No. 3,049,505 are themselves thermoplasts. Relatively large moldings produced from these blends cannot be stacked without distortion. The impact strength of the products at low-temperatures is moderate and their resistance to abrasion poor.

German Offenlegungsschrift No. 2,014,385 describes the reaction of copolymer latices containing isocyanate-reactive groups based on, for example, butadiene, styrene, methacrylates, acrylonitrile and the like and co-monomers containing reactive hydrogen atoms with polyisocyanates. In the molding thus obtained, the latex represents the continuous matrix. These products are not thermoplast. In contrast to these materials, the plastics according to the invention described hereinafter have far higher strengths and rigidity levels.

German Offenlegungsschriften Nos. 2,627,073 and 2,627,074 relate to dispersions of polyurethane ureas in polyols of relatively high molecular weight which may also contain polymer latices. These filler-containing polyols are used as starting material for the production of PUR-foams. The foams described in the Examples cannot be formed thermoplastically. The same also applies to U.S. Pat. No. 2,993,013.

German Auslegeschrift No. 2,355,942 relates to adhesives based on mixtures of polyurethane, styrene copolymers and, optionally, ABS-polymers. The adhesive effect is dependent upon the presence of the styrene copolymers. In contrast to the graft polymers present in the materials according to the invention, the polymer component of the mixtures according to German Auslegeschrift No. 2,355,942 thus contain at least about 60% by weight of the monomers such as styrene, α-methyl styrene and acrylonitrile. There is no reference in German Auslegeschrift No. 2,355,942 to any thermoplastic processibility of the polymer mixtures. Tests have shown that the polymer mixtures have poor low-temperature impact strength and low resistance to abrasion.

German Offenlegungsschrift No. 2,128,199 describes a process for producing mixtures of PUR thermoplasts and other thermoplastic polymers. However, these copolymers do not have any impact strength and show low mechanical strength and, in particular, poor resistance to abrasion.

The stackability of moldings freshly injected from conventional products is inadequate. In addition, the known polymer blends show poor thermal stability under load.

It has now surprisingly been found that, by combining TPU with a few percent of a graft rubber (which is not a thermoplast as such) having a certain composition, it is possible to obtain thermoplastic materials which behave particularly favorably in regard to low-temperature impact strength, resistance to abrasion and resistance to scratching. The stackability of complicated injection moldings is distinctly improved and thermal stability under load is increased.

DESCRIPTION OF THE INVENTION

The present invention relates to a thermoplastic synthetic material, comprising:
(A) 75 to 97% by weight, preferably 88 to 96% by weight, of a thermoplastic polyurethane and
(B) 25 to 3% by weight, preferably 12 to 4% by weight, of a polymer of olefinically unsaturated monomers,
wherein component (b) is a graft product of
(a) 5 to 35% by weight, preferably 12.5 to 25% by weight, based on the graft product of one or more graft monomers and
(b) 65 to 95% by weight, preferably 75 to 87.5% by weight, based on the graft product of an elastomer component serving as graft base which has a second order transition temperature below $-30°$ C. and preferably below $-50°$ C., the entire component (B) containing less than 50% by weight, preferably less than 40% by weight and, more particularly, less than 30% by weight of the monomers styrene, α-methyl styrene and acrylonitrile.

Graft products according to the invention are obtained by polymerizing the monomers to be grafted in the presence of the elastomer component produced in a separate polymerization step. The graft products may be produced by known polymerization processes, including emulsion, suspension and bulk polymerization and also combinations of these processes, as described for example in the literature discussed herein or in U.S. Pat. No. 2,820,773.

According to the invention, emulsion polymerization is preferred.

Elastomer components suitable as the graft base are rubber-like polymers having a second-order transition temperature $T_G$ of below $-30°$ C. (DIN 53445) and preferably below $-50°$ C. It is preferred to use 1,3-diene and acrylate rubbers, such as for example butadiene and/or isoprene polymers, containing up to 30% by weight of styrene and/or acrylonitrile and also copolymers of butadiene and acrylic acid alkyl esters. Butadiene polymers containing up to 10% by weight of styrene and/or acrylonitrile are particularly preferred.

If the graft products are produced by emulsion polymerization, the particle size of the graft base (i.e. the particle diameter $d_{50}$ which is the mean diameter below which and above which, respectively, 50% of the particles lie) should preferably be in the range from 0.05 to 0.8 μm. These graft bases used for emulsion polymerization may be crosslinked or uncrosslinked. Products having a gel content of more than 30% by weight, as measured in toluene, are particularly preferred.

Monomers suitable for grafting are, in particular, styrene, α-methyl styrene and acrylonitrile. For special effects, however, these monomers may be completely or partly replaced by methacrylonitrile, alkyl esters of acrylic acid, alkyl esters of methacrylic acid or by halogen derivatives of styrene and α-methyl styrene. Mixtures of styrene and acrylonitrile in a ratio by weight of frm 9:1 to 1:1 are preferably used as the graft monomer.

The ratio by weight of graft base to graft monomers lies between 65:35 and 95:5, ratios by weight of from 75:25 to 87.5:12.5 being particularly preferred.

According to the invention, preferred (meth) acrylic acid esters are those containing from 4 to 10 carbon atoms, more particularly from 4 to 6 carbon atoms, in the alcohol component. This applies both to the graft base and to the graft monomers.

It is of course also possible to use mixtures of several graft products, in which case each graft product should fulfill the conditions mentioned above.

The thermoplastic polyurethanes (component A) are generally known in the art. They generally consist of long-chain polyols having a molecular weight in the range from 400 to 10,000, polyisocyanates (preferably diisocyanates) and chain extenders (preferably short-chain polyols having molecular weight of up to 380), the equivalent ratio of isocyanate groups ot Zerewitinoff-active hyrogen atoms (referred to hereinafter as the NCO/OH-ratio) preferably lying between 0.95 and 1.10 and, preferably between, 0.98 and 1.08.

Substantially linear polyols having molecular weights of from 400 to 10,000, preferably from 800 to 6,000, which may be used in accordance with the invention include virtually any polyesters, polyacetones, polyethers, polythioethers, polyester amides, polycarbonates and polyacetals, known, and specifically those generally preferably containing two or, in small quantities, even three Zerewitinoff-active groups (essentially hydroxyl groups), vinyl polymers such as, for example, polybutadiene diols, polyhydroxyl compounds already containing urethane or urea groups, natural polyols which may be modified and also compounds containing other Zerewitinoff-active groups, such as amino, carboxyl or thiol groups. These compounds are known in the prior art and are described in detail, for example, in German Offenlegungsschriften Nos. 2,302,564; 2,423,764; 2,549,372 (U.S. Pat. No. 3,963,679) and 2,402,840 (U.S. Pat. No. 3,984,607) and in German Auslegeschrift No. 2,457,387 (U.S. Pat. No. 4,035,213). According to the invention, it is preferred to use hydroxyl-containing polyesters of glycols and adipic acid, phthalic acid and/or terephthalic acid and their hydrogenation products, hydroxyl polycarbonates, polycaprolactones, polyethylene oxide, polypropylene oxide, polytetrahydrofuan and mixed polyethers of ethylene oxide and propylene oxide. Polyesters of glycols and adipic acid and polycaprolactone diols are particularly preferred.

The diisocyanates which may be used in accordance with the invention include essentially any aliphatic, cycloaliphatic, aromatic, araliphatic and heterocyclic diisocyanates and specifically of the type generally known and described, for example, in the above-mentioned German Offenlegungsschriften Nos. 2,302,564; 2,423,764; 2,549,372; 2,402,840 and 2,457,387. The diisocyanates which are preferably used in accordance with the invention are hexamethylene diisocyanate, isophorone diisocyanate, diphenyl methane diisocyanate and naphthalene-1,5-diisocyanate which may be substituted by methyl groups.

The above-mentioned diisocyanates may be used together with up to about 15 mol %, based on the diisocyanate, of a higher polyisocyanate. However, the quantity in which the higher polyisocyanate is used must be limited so that the product obtained is still fusible or thermoplastic. In general, a relatively large quantity of higher isocyanates has to be compensated by using on the average less than difunctional hydroxyl or amino compounds (or even monoisocyanates) so as to avoid excessive chemical crosslinking of the product. Examples of higher isocyanates and monofunctional compounds can also be found in the prior art referred to above. Reference is made by way of example to monoamines (such as butyl and dibutylamine, octylamine, stearylamine, N-methyl stearylamine, pyrrolidine, piperidine and cyclohexylamine), and to monoalcohols (such as butanol, 1-ethyl hexanol, octanol, dodecanol, amyl alcohols, cyclohexanol and ethylene glycol monomethyl ether).

The chain extenders used in the invention are generally known and described, for example, in German Offenlegungsschriften Nos. 2,302,564; 2,423,764; 2,549,372; 2,402,799; 2,402,840 and 2,457,387. Examples of suitable chain extenders are low molecular weight polyalcohols (preferably glycols), polyamines, hydrazines and hydrazides. Aminoalcohols, such as ethanolamine, diethanolamine, N-methyl diethanolamine, triethanolamine and 3-aminopropanol, may also be used in accordance with the invention. Preferred chain extenders are ethylene glycol, di- and tri-ethylene glycol, 1,4-butane diol, 1,6-hexane diol and hydroquinone di-β-hydroxyethyl ether. It is particularly preferred to use hydroquinone di-β-hydroxyethyl ether, 1,4-butane diol and 1,6-hexane diol.

In the case of particularly hard thermoplastic polyurethanes (>50 Shore D, preferably >60 Shore D), extreme brittleness at low temperatures (low notched impact strength) is observed without the addition of graft rubbers according to the invention. In this case, a considerable improvement is obtained by adding the graft rubbers. Thermoplastic polyurethanes as hard as these are obtained when the molar ratio of chain extender to long-chain polyol is >4:1 and preferably 226:1. The usual hydrolysis and oxidation stabilizers may of course be added to the polyurethane components as described in the prior art.

It is also advisable additionally to add antioxidants, such as 2,6-tert. butyl-4-methylphenol, other sterically hindered phenols or other standard antioxidants either individually or in admixture in a quantity of from about 0.1 to 1.5% by weight, based on the total blend, in order to stabilize the graft rubber. These additives may be introduced either into the graft rubber or into the polyol component of the polyurethane.

Where polyester urethanes are used (and less advantageously in the case of 1,2-polypropylene glycol ether), peroxides such as, for example, dicumyl peroxide, cumyl tert. peroxides and α,α'-di-(tert.-butylperoxy)-diisopropyl benzene may be added in a quantity of up to 3% by weight, based on the graft rubber used, for the purpose of subsequent crosslinking.

The thermoplastic materials according to the invention may be produced for example by separately producing components A and B in accordance with the prior art and then dry-mixing ("dry-blending") them, optionally in the presence of the above-mentioned additives. Dry-blending may be carried out for example in standard internal mixers and extruders.

According to the invention, however, it is preferred to carry out the reaction of the polyurethane-forming components actually in the presence of the graft rubber and, optionally, the above-mentioned additives. To this end, it is of particular advantage to use a reaction screw of the type described, for example, in U.S. Pat. Nos. 3,233,025 and 3,624,964, in German Offenlegungsschrift 2,447,368, in German Auslegeschrift 2,610,980 and, more particularly, in German Auslegeschriften 2,302,564 and 2,549,372 (U.S. Pat. No. 3,963,679). In cases where a reaction screw is used, the polyurethane-forming components are introduced into the screw, either in premixed form or even separately at one or more points, optionally split into several portions, and the graft rubber introduced at any point of the screw. In many cases, it may be of advantage to introduce the graft rubber into the screw and then to melt it completely or in part before the polyurethane-forming components are introduced through further inlets. In this case, there is no need for the special kneading elements required for the process according to U.S. Pat. No. 3,963,679.

The materials according to the invention are used in particular for applications where severe impact stressing can occur at low temperatures, for example in the vehicle industry for bodywork sections or for ski boot shells. Even large moldings undergo virtually no distortion on storage and acquire their final strengths relatively quickly.

The new polymer mixtures may also be extruded, calendered and formed by any of the other processes normally used in the processing of thermoplast.

In the Examples, the polyurethane reaction is carried out in a twin-screw kneader. Suitable screw kneaders are described for example in German Pat. Nos. 813,154; 862,668 and 940,109, in German Offenlegungsschrift No. 2,302,564 (U.S. Pat. No. 3,963,679) and in U.S. Pat. Nos. 3,233,025 and 3,642,964.

The residence times of the reaction melt in the screw generally amount to between 0.3 and 30 minutes and preferably to between 0.5 and 4 minutes. The temperature of the screw housing is between about 60 and 300° C. (approximately 80° to 280° C. in the feed zone; approximately 100° to 300° C. in the middle of the extruder and approximately 60° to 250° C. in the discharge zone). The melt issuing from the extruder is quenched and size-reduced by methods known per se. The end products may be processed in the usual way either thermoplastically or in solution to form films, gear wheels, cable sheaths, seals, etc.

The invention is illustrated by the following Examples in which the quantities quoted represent parts by weight or % by weight, unless otherwise indicated. The screw kneader used in Examples 1 and 2 is a twin-screw kneader of the ZSK 53 V type manufactured by Werner & Pfleiderer, Stuttgart, with self-cleaning screws. The length of the processing section corresponds to approximately 42 times the screw diameter which amounts to 53 mm. The same shaft equipment of which approximately 20% are occupied by kneading elements, are used for all of the Examples. The kneading elements are arranged in 3 kneading zones being located at the end of the first, second and third part of the extruder, respectively, as described in the Examples of U.S. Pat. No. 3,963,679. The processing part consists of 12 housings of about equal length of which the first is provided with a feed hopper for the thermoplast. The function of the screw kneader and of the kneading and delivery elements of the screws and the like are described in detail in pamphlets published by Werner and Pfleiderer and in German Offenlegungsschrift 2,302,564 (U.S. Pat. No. 3,963,679).

EXAMPLES

EXAMPLE 1 a (Comparison Example)

The following ingredients are introduced into the feed hopper:
- 40.1 parts of an adipic acid/butane diol polyester (hydroxyl number 56);
- 0.2 part of stearylamide;
- 0.2 part of 2,6-di-tert.-butyl-4-methyl phenol;
- 0.2 part of 2,2',6,6'-tetra-isopropyl diphenyl carbodiimide;
- 14.03 parts of 1,4-butane diol and
- 45.27 parts of 4,4'-diphenylmethane diisocyanate (NCO/OH-ratio 1.03).

The additives are introduced together with the polyester at 100° C., the chain extender at around 25° C. and the diisocyanate at 60° C. The following screw barrel temperatures are adjusted:

| Barrel | 1 | 3 | 5 | 7 | 9 | 11 | 12 |
|---|---|---|---|---|---|---|---|
| Temp. °C.: | 100 | 200 | 220 | 210 | 180 | 180 | 140 |

Head temp: 200° C.

A thermoplast is obtained. After storage for 2 days, injection and tempering for 15 hours at 110° C., it shows the following properties.

| Test | Standard | Unit | Value |
|---|---|---|---|
| Abrasion loss | DIN 53516 | mm³ | 25 |
| Hardness Shore D | DIN 53505 | — | 62 |
| Flexural Stress at a given deflection | DIN 53452 | MPa | 12 |
| Tensile strength | DIN 53504 | MPa | 55 |
| Elongation at break | DIN 53504 | % | 400 |
| Notched impact strength at −30 °C. | DIN 53453 | kJ/m² | 3 |
| Softening point (TMA) | internal test standard | °C. | 39 |

The softening point was determined using a Perkin-Elmer thermomechanical analyzer (TMS 1): on plate-shaped test specimens measuring 12×3×2 mm supported at both ends, the degree of sag produced by a load of 0.2 N applied to the middle of the plate is measured as a function of temperature. The heating rate amounts to 2.5° C. per minute upwards of 20° C. The temperature at which there is a distinct increase in sag with increasing temperature (tangent cut) is measured.

The value of 39° C. determined in the present case is indicative of poor thermal stability under load of the pure TPU. Above all, however, the low temperature notched impact strength is not satisfactory.

EXAMPLE 1 b (Comparison Example)

90 parts of the reaction mixture of Example 1 a consisting of
- 36.08 parts of adipic acid/butane diol polyester;
- 0.18 part of stearylamide;
- 0.18 part of 2,6-di-tert.-butyl-4-methyl phenol;
- 0.18 part of 2,2',6,6'-tetra-isopropyl diphenyl carbodiimide;
- 12.63 parts of 1,4-butane diol and 40.74 parts of 4,4'-diphenyl methane diisocyanate are introduced per unit of time into housing 2 and 10 parts of an emulsion ABS-polymer containing 15% by weight of butadiene, 60% by weight of styrene and 25% by weight of acrylonitrile into the hopper of the screw extruder. These standard commerically available ABS polymers consist essentially of the monomers acrylonitrile (A), butadiene (B) and styrene or α-methyl styrene (S). Butadiene may be completely or partly replaced by another rubber component, for example by an EPDM rubber, to produce so-called ABS-polymers. These polymers are produced in known manner by emulsion, suspension, bulk or solution polymerization or by combinations of these processes, as described for example by D. H. Baskedis in "ABS-Plastics," Reinhold Publishing Corporation, New York, 1964.

The processing temperatures are the same as in Example 1 a. The ABS-polymer is added at about 25° C.

After storage, injection molding and tempering, the thermoplast has the following properties:

| Test | Standard | Unit | Value |
|---|---|---|---|
| Abrasion resistance | DIN 53516 | mm$^3$ | 50 |
| Hardness Shore D | DIN 53505 | — | 65 |
| Flexural stress at a given deflection | DIN 53452 | MPa | 16 |
| Tensile strength | DIN 53504 | MPa | 32 |
| Elongation at break | DIN 53504 | % | 210 |
| Notched impact strength at −30° C. | DIN 53453 | kJ/m$^2$ | 9 |
| Softening point (TMA) | internal test standard | °C. | 37 |

It can be seen that, where the standard commercially available ABS-polymers are used, the low temperature notched impact strength of the thermoplast is poor and its strength and thermal stability under load mediocre. Its resistance to scratching for example by steel edges, is low.

EXAMPLE 1 c (process according to the invention)

The procedure is as in Example 1b, except that 10 parts of graft rubber A are used instead of the standard commerically available ABS-polymer. Graft rubber A was produced as follows:

Production of the graft base

A mixture of 68 parts of demineralized water, 0.5 part of the sodium salt of disproportionated abietic acid, 100 parts of butadiene, 0.4 part of n-dodecyl mercaptan and 0.5 part of potassium peroxy disulphate is introduced into a pressure-tight stirrer-equipped vessel. The reaction is carried out between 55° and 75° C. (start-end temperature). Another 1.5 parts of the sodium salt of disporportionated abietic acid are added during the reaction. Polymerization is continued up to a conversion of around 98%.

Characteristics of the polybutadiene latex formed:
 Concentration: 58.5%,
 Gel content in toluene: >80%,
 Particle size: $d_{50}$=0.4 μm,
 Second order transition temperature: −80° C. (DIN 53445).

Production of a graft polymer 137 parts of the graft base latex are introduced into a stirrer-equipped vessel and diluted with 118 parts of demineralized water in which 0.5 part of potassium peroxy disulfate have been previously dissolved. After the air present has been displaced from the solution by passing nitrogen through it and heating to 65° C., (a) 2 parts of the sodium salt of disproportionated abietic acid (dissolved in 25 parts of water) and (b) a mixture of 5.6 parts of acrylonitrile and 14.4 parts of styrene are added uniformly in two separate streams over a period of 4 hours. To complete the reaction, the reaction mixture is stirred for a further 2 hours at 65° C. on completion of the additions.

The graft polymer latex thus obtained is coagulated with a 2% magnesium sulfate solution, the coagulate is separated off, washed free from salts and dried in vacuo at +70° C.

Characteristics of the graft polymer:
 Elastomer content: 80%,
 Styrene content: 14.4%,
 Acrylonitrile content: 5.6%.

After storage for 2 days, injection molding and tempering for 15 hours at 110° C., the thermoplast shows the following properties:

| Test | Standard | Unit | Values |
|---|---|---|---|
| Abrasion loss | DIN 53516 | mm$^3$ | 18 |
| Hardness Shore D | DIN 53505 | — | 61 |
| Flexural stress at a given deflection | DIN 53452 | MPa | 13 |
| Tensile strength | DIN 53504 | MPa | 39 |
| Elongation at break | DIN 53504 | % | 290 |
| Notched impact strength at −30° C. | DIN 53453 | kJ/m$^2$ | 18 |
| Softening point (TMA) | internal test standard | °C. | 75 |

This thermoplast shows very high abrasion resistance, high scratch resistance, for example a ski boot in contact with a steel edge, and, above all, outstanding low-temperature notched impact strength at −30° C. By comparison with pure TPU or with the products of tests 1b and 1d, its thermal stability under load is considerably better.

EXAMPLE 1 d (Comparison test)

The procedure is as in Example 1c, except that, instead of graft rubber A, 10 parts of the pure elastomer component of graft rubber A (polybutadiene obtained by emulsion polymerization) are introduced into the hopper of the twin-screw extruder.

The processing temperatures are the same as in example 1a. The polybutadiene is added at around 25° C.

After storage of the granulate for 2 days, injection molding and tempering for 15 hours at 110° C., the thermoplast shows the following properties:

| Test | Standard | Unit | Values |
|---|---|---|---|
| Abrasion loss | DIN 53516 | mm$^3$ | 60 |
| Hardness Shore D | DIN 53505 | — | 58 |
| Flexural stress at a given deflection | DIN 53452 | MPa | 10 |
| Tensile strength | DIN 53504 | MPa | 29 |
| Elongation at break | DIN 53504 | % | 90 |
| Notched impact strength at −30° C. | DIN 53453 | kJ/m$^2$ | 3 |
| Softening point | internal test standard | °C. | 45 |

The strengths and low-temperature notched impact strength of this product are poor.

EXAMPLE 2a (according to the invention)

20 parts of graft rubber A (see Example 1c) are introduced into the hopper of the screw extruder and 32.08 parts of polycaprolactone diol (hydroxyl number 56);

0.16 part of stearylamide;
0.16 part of 2,6-di-tert.-butyl-4-methyl phenol;
0.16 part of 2,2',6,6'-tetra-isopropyl diphenyl carbodiimide;
11.22 parts of 1,4-butane diol and
36.22 parts of 4,4'-diphenyl methane diisocyanate are introduced into housing 2.

After storage for 2 days, injection molding and tempering for 15 hours at 110° C., the thermoplast shows the following properties:

| Test | Standard | Unit | Values |
|---|---|---|---|
| Abrasion loss | DIN 53516 | mm³ | 22 |
| Hardness Shore D | DIN 53505 | — | 60 |
| Flexural stress at a given deflection | DIN 53452 | MPa | 11 |
| Tensile strength | DIN 53504 | MPa | 36 |
| Elongation at break | DIN 53504 | % | 300 |
| Notched impact strength at −30° C. | DIN 53453 | kJ/m² | 27 |

EXAMPLE 2b (according to the invention)

5 parts of graft rubber A from text 1c are introduced into the hopper of the twin-screw kneader and,
38.09 parts of polycaprolactone diol (hydroxyl number 56);
0.19 part of stearylamide;
0.19 part of 2,6-di-tert.-butyl-4-methyl phenol;
0.19 part of 2,2',6,6'-tetra-isopropyl diphenyl carbodimide;
13.33 parts of 1,4-butane diol and
43.01 parts of 4,4'-diphenyl methane diisocyanate are introduced into housing 2. The addition and processing temperatures are the same as in Example 1. The graft rubber is added at around 25° C.

After storage for 2 days, injection molding and tempering for 15 hours at 110° C., the thermoplast obtained shows the following properties:

| Test | Standard | Unit | Value |
|---|---|---|---|
| Abrasion loss | DIN 53516 | mm³ | 17 |
| Hardness Shore D | DIN 53505 | — | 61 |
| Flexural stress at a given deflection | DIN 53452 | MPa | 12 |
| Tensile strength | DIN 53504 | MPa | 44 |
| Elongation at break | DIN 53504 | % | 350 |
| Notched impact strength at −30° C. | DIN 53453 | kJ/m² | 18 |

The scratch and abrasion resistance of thermoplast 2b are particularly good and moldings freshly produced from this thermoplast can be stacked without difficulty.

EXAMPLE 3 (according to the invention)

A thermoplastic polyurethane (80 parts of granulate) produced in accordance with the recipe of Example 2a (without graft rubber A) is introduced with 20 parts of graft rubber A into a twin-screw extruder. After granulation, injection molding and tempering, the thermoplast obtained shows the following properties:

| Test | Standard | Unit | Values |
|---|---|---|---|
| Abrasion loss | DIN 53516 | mm³ | 26 |
| Hardness Shore D | DIN 53505 | — | 59 |
| Flexural stress at a given deflection | DIN 53452 | MPa | 10 |
| Tensile strength | DIN 53504 | MPa | 31 |
| Elongation at break | DIN 53504 | % | 260 |
| Notched impact strength at −30° C. | DIN 53453 | kJ/m² | 24 |

The thermoplast produced by dry-blending still shows extremely good properties, but is somewhat inferior in its strength values in comparison with the thermoplast obtained in accordance with Example 2a.

What is claimed is:

1. A thermoplastic synthetic material, comprising:
   (A) 75 to 97% by weight of a thermoplastic polyurethane and
   (B) 25 to 3% by weight of a polymer of olefinically unsaturated monomers,
   wherein component (B) is a graft product of
      (a) 12.5 to 25% by weight, based on the graft product, of one or more graft monomers on
      (b) 75 to 87.5 by weight, based on the graft product, of an elastomer component serving as graft base which has a second order transition temperature of below −50 C.,
   the entire component (B) containing less than 30% by weight of the monomers styrene, α-methyl styrene and acrylonitrile.

2. The thermoplastic synthetic material of claim 1, wherein 88 to 96%, by weight, is component (A) and 12 to 4%, by weight, is component (B).

3. The thermoplastic synthetic material of claim 1, wherein said graft monomers are selected from the group comprising styrene, α-methyl styrene, acrylonitrile, methacrylontrile, acrylic acid alkyl esters and methacrylic acid alkyl esters.

4. The thermoplastic synthetic material of claim 3, wherein said graft monomers styrene and acrylonitrile are present in a ratio by weight of from 9:1 to 1:1.

5. The thermoplastic synthetic material of claim 1, wherein said graft base is selected from the group consisting of 1,3-diene rubbers and acrylate rubbers from the group comprising
   (a) polymers of 100 to 70% by weight of butadiene and/or isoprene and 0 to 30% by weight of styrene and/or acrylonitrile and
   ((b) copolymers of butadiene and acrylic acid alkyl esters.

6. The thermoplastic synthetic material of claim 5, wherein said graft base is copolymers of butadiene and acrylic acid alkyl esters.

7. The thermoplastic synthetic material of claim 5, wherein said graft base comprises polymers of 100 to 70%, by weight, of butadiene and/or isoprene and 0 to 30%, by weight, of styrene and/or acrylonitrile.

8. The thermoplastic synthetic material of claim 7 wherein said graft base is a polymer or copolymer of 90 to 100% by weight of butadiene and 0 to 10% by weight of styrene and/or acrylonitrile.

9. The thermoplastic synthetic material of claim 1 wherein component (A) is a reaction product of
   (a) a diisocyanate,
   (b) a polyester or polylactone containing two hydroxyl groups and having a molecular weight in the range from 800 to 6000 and
   (c) a chain extender from the group comprising 1,4-butane diol, 1,6-hexane diol and hydroquinone di-β-hydroxy-ethyl ester, the NCO/OH-equivalent ratio lying between 0.95:1 and 1.1:1 and the molar ratio of component (b) to component (c) being less than 1:4.

10. A process for producing the thermoplastic synthetic materials comprising mixing and co-extruding
(A) 75 to 97% by weight of a thermoplastic polyurethane and
(B) 25 to 3% by weight of a polymer of olefinically unsaturated monomers,
wherein component (B) is a graft product of
(a) 12.5 to 25% by weight, based on the graft product, of one or more graft monomers on
(b) 75 to 87.5% by weight, based on the graft product, of an elastomer component serving as graft base which has a second order transition temperature of below $-50°$ C. and, optionally, stabilizers and crosslinking agents,
the entire component (B) containing less than 30% by weight of the monomers styrene, $\alpha$-methyl styrene and acrylonitrile.

11. The process of claim 10, wherein component (A) is synthesized by the polyaddition of polyurethane-forming compounds in the presence of component (B) and, optionally, stabilizers and crosslinking agents in a twin-screw reaction extruder.

* * * * *